F. E. NEWLON.
BEET HARVESTER.
APPLICATION FILED JUNE 18, 1906.

931,789.

Patented Aug. 24, 1909.
4 SHEETS—SHEET 3.

Witnesses
A. G. Hague
K. K. Keffer.

Inventor
F. E. Newlon
By Orwig & Lam attys

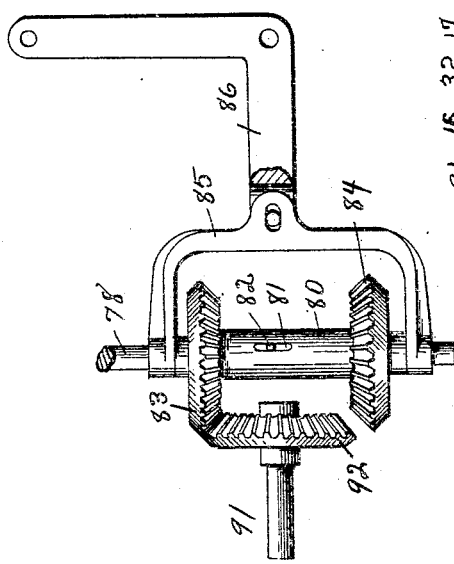

UNITED STATES PATENT OFFICE.

FRANCIS E. NEWLON, OF CULBERTSON, NEBRASKA.

BEET-HARVESTER.

931,789.

Specification of Letters Patent.

Patented Aug. 24, 1909.

Application filed June 18, 1906. Serial No. 322,636.

*To all whom it may concern:*

Be it known that I, FRANCIS E. NEWLON, a citizen of the United States, residing at Culbertson, in the county of Hitchcock and State of Nebraska, have invented a certain new and useful Beet-Harvester, of which the following is a specification.

The object of my invention is to provide a beet harvester designed to be advanced over a field by draft animals; to cut tops from the beets while they are still in the ground; to automatically adjust the cutting device to cut beet tops the same distance from the beets regardless of how far the beets project above the ground; to dig the beets from the ground after the tops are severed; to convey them to a hopper; to provide means whereby the operator may dump the hopper to either side so that beets may be discharged upon the ground over which the harvester has already passed no matter in which direction it is moving across the field; to automatically convey the beet tops to one or the other of two hoppers arranged on opposite sides of the harvester, and to provide means whereby the operator may discharge the beet tops from either hopper in piles upon the ground over which the harvester has already passed, no matter in which way the harvester is moving across the field.

My invention consists in the construction, arrangement and combination of the various parts of the device, whereby the objects contemplated are attained, as hereinafter more fully set forth, pointed out in my claims and illustrated in the accompanying drawings, in which—

Figure 1:
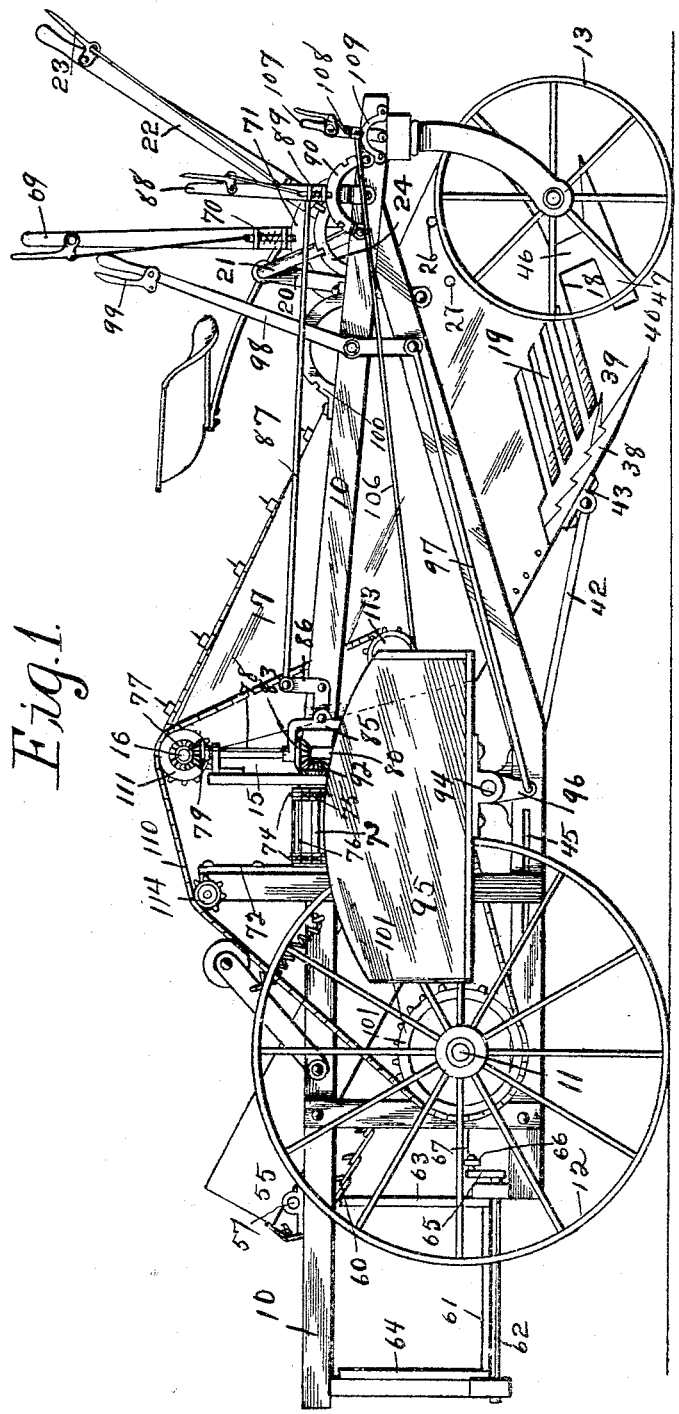
Figure 2:
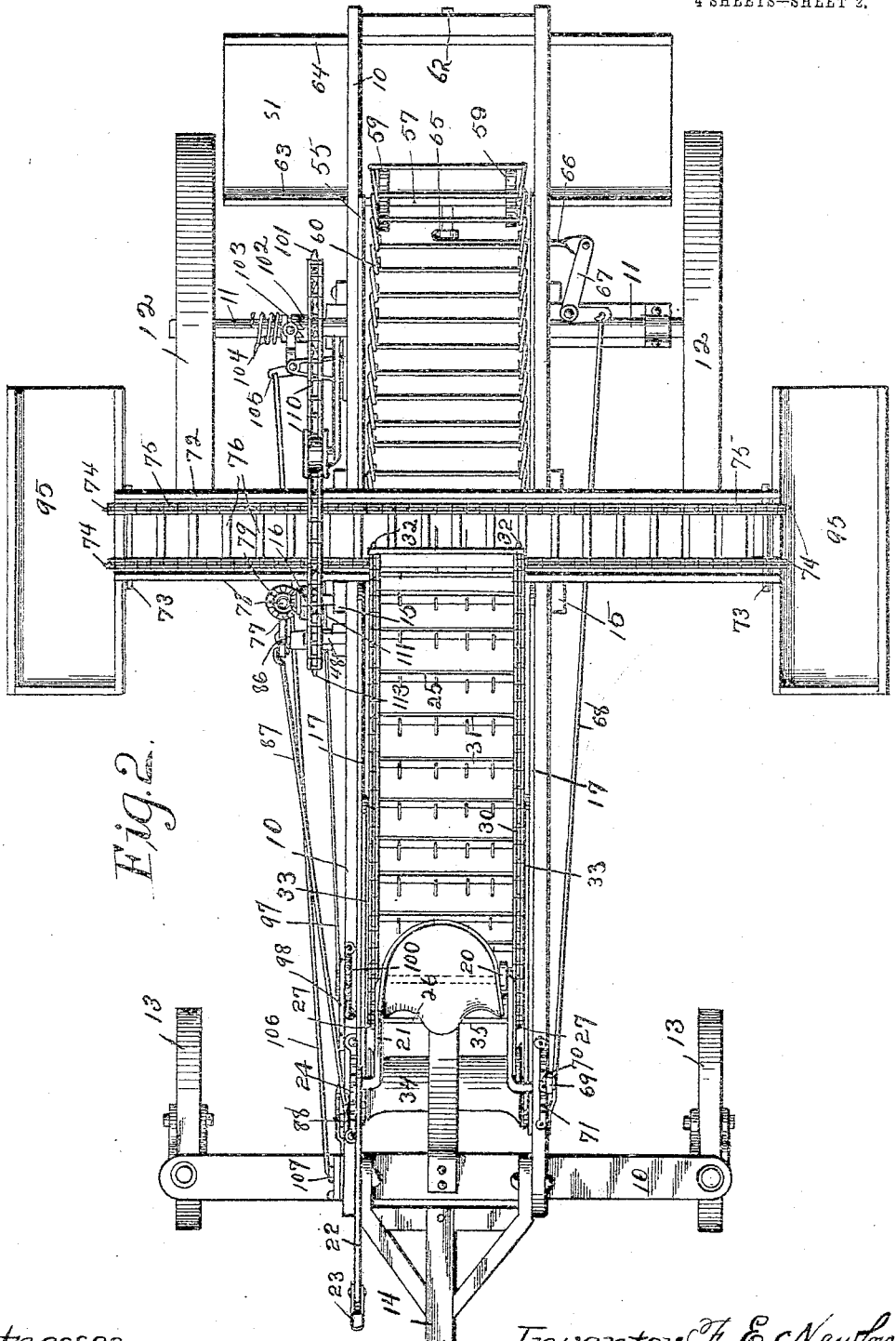
Figure 3:
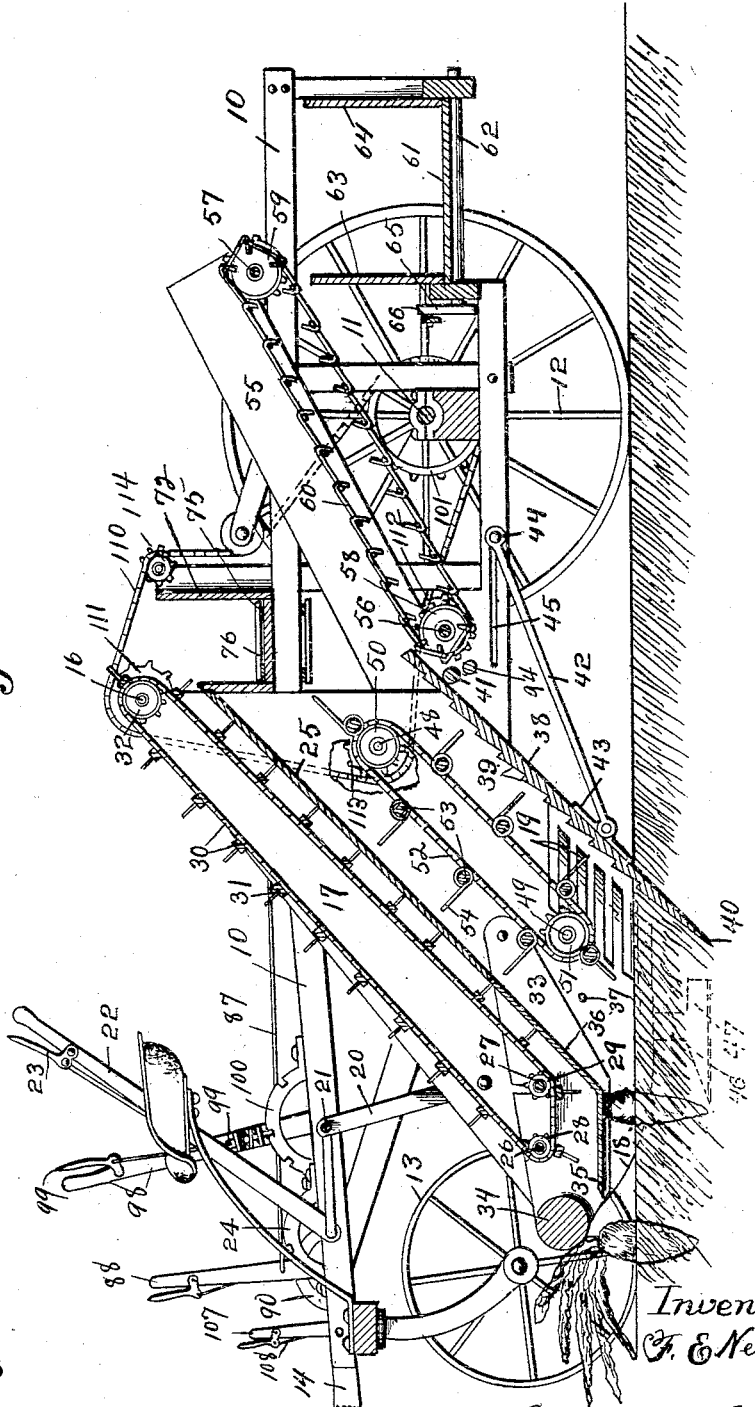

Figure 1 shows a side elevation of a complete beet harvester embodying my invention. Fig. 2 shows a plan view of same. Fig. 3 shows a longitudinal, sectional view of same partly in side elevation. Fig. 4 shows a rear end elevation of same. Fig. 5 shows an enlarged detail view illustrating the under surface of the forward end of the beet digger, and Fig. 6 shows an enlarged detail view of the means for changing the direction of movement of the beet top conveyer.

Referring to the accompanying drawings, I have used the reference numeral 10 to indicate the machine frame. Near its rear end is the rotatable main axle 11 on which are the traction wheels 12. At the forward end of the frame are two caster wheels 13 and a tongue 14. The driver's seat is also located at the forward end of the frame.

At about the center of the frame are two stationary uprights 15 in which a rotatable transverse shaft 16 is mounted. Pivotally supported on this shaft 16 are the sides 17, of the frame that supports the cutting and conveying devices. These sides extend downwardly and forwardly and at the lower edge of each is the sharpened cutter 18 extended longitudinally of the machine and designed when at their lower limit to enter the ground at the sides of the rows of beets being harvested. At the rear of the lower edge of these sides, I have formed the fingers 19 with spaces between them to permit earth to pass outwardly, the rear ends of said fingers being curved outwardly and rearwardly. Pivoted to the forward upper corner of these sides 17 are the links 20 extended upwardly and pivoted to the crank shaft 21. This crank shaft is controlled by a lever 22 provided with a spring actuated pawl 23 to engage a sector 24, whereby the operator may adjust the sides 17 from the position shown in Fig. 3, to the elevated position, shown in Fig. 1. Arranged between the sides 17 is the conveyer bottom 25. Between the forward end portions of the sides 17 are two transverse shafts 26 and 27 on which are the sprocket idlers 28 and 29, said shafts being arranged in substantially horizontal alinement.

A conveyer consisting of the chains 30 and the toothed cross pieces 31 is arranged to pass around the sprocket wheels 28 and 29 and also around the sprocket wheels 32 fixed to the shaft 16.

The frame for carrying the knife for cutting the tops, and the guiding roller, comprises two sides 33 pivoted at their rear ends between the sides 17. At the forward ends of these sides 33 is the guiding roller 34 and beneath and slightly in the rear of this guiding roller is the knife 35 arranged horizontally, with its cutting edge extending across the machine frame. In the rear of the knife 35 is a partition 36 extending upwardly and rearwardly and meeting the lower end of the bottom 25. The up and down movement of the forward end of the side 33 is not limited, except that a pin 37 is provided in one of the sides 17 to prevent the sides 33 from moving downwardly too far.

The means for digging and elevating the beets after their tops are severed, comprises first, a digger blade comprising a flat body portion 38 with a notched upper surface 39 and a pointed lower end 40. This blade has its top mounted upon a supporting pin 41 on the machine frame and its lower end is supported in position inclined downwardly and forwardly by means of two arms 42 pivoted to the lugs 43 and having their rear ends slidingly connected with the machine frame by means of the bolts 44 in the horizontal slots 45. The sides 17 extend down to, and are fixedly connected with, the digger blade so that said blade will be elevated above the ground surface with said sides, the bolts 44 and the slots 45 being provided to permit this, but a rearward movement of the blade 38 is prevented by the bolts 44. On the lower edges of the sides 17 are the earth cutting blades each comprising a downwardly extending arm 46 and a pointed blade 47, both the arm and blade being in line with the side 17 to which it is fixed, to thereby cut narrow grooves in the ground on opposite sides of the row of beets, so that the digger blade 38 may readily tear up the beets and the ground between the blades 47 and cause the beets to travel upwardly upon the digger blade 38.

I have provided a conveyer for moving the beets upwardly over the blade 38 as follows: Mounted between the sides 17 are two transverse shafts 48 and 49 upon which are the sprocket wheels 50 and 51. The conveyers are composed of the chains 52, cross pieces 53 and spring teeth 54 normally standing outwardly from the chain. These spring teeth are arranged to travel upwardly and rearwardly adjacent to the upper face of the digger blade 38.

I have provided for conveying the beets from the rear upper end of the digger blade 38 into a hopper at the rear of the machine as follows: 55 indicates stationary side boards fixed at the rear of the frame and extending upwardly and rearwardly from the rear of the digger blade 38. Arranged beneath the opposite ends of these side boards are the shafts 56 and 57 on which the sprocket wheels 58 and 59 are mounted. An open link conveyer 60 is passed around said sprocket wheels and arranged to have its upper portion travel from beneath the rear end of the blade 38 upwardly and rearwardly between the side boards 55.

The hopper for receiving the beets comprises a bottom 61 fixed to a rock shaft 62 at the rear of the machine. On the bottom 61 are the sides 63 and 64, both ends of the hopper, thus formed, are open. On the shaft 62 is a crank arm 65 and a rod 66 is pivoted to this crank arm and to a bell crank lever 67. A rod 68 is attached to the other end of the bell crank lever and to a lever 69 pivoted to the frame near the driver's seat. Connected with the lever 69 is a pawl 70 to engage a sector 71 on the machine frame. By this arrangement, the beet hopper is normally held in a horizontal position and the operator may, by manipulating the lever 69, tilt it to discharge the beets in either direction so that the beets thus discharged may fall upon the ground that has already been passed over by the harvester, no matter in which direction the harvester is moving over the field.

The means for disposing of the beet tops comprise a chute 72 extending transversely across the machine frame to pass beyond the traction wheel 12. In the ends of this chute are the shafts 73 provided with sprocket wheels 74 and a conveyer comprising the chains 75 and cross pieces 76 travels over said sprocket wheels. The upper portion of the conveyer travels above the bottom of the chute. I have provided for driving this conveyer in either direction as follows: Fixed to the shaft 16 is a beveled pinion 77. The reference numeral 78 indicates an upright shaft having at its top the beveled pinion 79 meshed with the pinion 77. Slidingly mounted on the lower end of the shaft 78 is a sleeve 80 provided with a slot 81. A pin 82 is passed through this slot into the shaft 78 to prevent rotation of the sleeve relative to the shaft. Fixed to the opposite ends of the sleeve 80 are the beveled pinions 83 and 84. The numeral 85 indicates a yoke slidingly mounted on the shaft 78 and in engagement with the ends of the sleeve 80. This yoke is controlled by a bell crank lever 86 fulcrumed to the machine frame and connected with a rod 87, which rod is attached to a lever 88 near the driver's seat. This lever is provided with a spring actuated pawl 89 to engage a sector 90. Arranged between the beveled pinions 83 and 84 is a shaft 91 having on its end a beveled pinion 92 to mesh with either one of the pinions 83 or 84 that may be placed in engagement with it by a movement of the lever 88. On this shaft 91 is a sprocket wheel 93 in engagement with one of the conveyer chains 75 and it is this sprocket wheel that serves to drive said conveyer. Obviously by this arrangement, said conveyer may be made to travel in either direction.

I have provided for discharging the beet tops in piles at either side of the machine frame, as desired, as follows: The numeral 94 indicates a rock shaft extended transversely of the machine and having fixed to each end a hopper 95 open at its rear, and designed to receive the discharge from the chute 72. Fixed to the shaft 94 and extending downwardly therefrom is a crank arm 96 connected with a rod 97, which, in turn, is pivoted to a lever 98 fulcrumed to the machine frame. Connected with the lever 98 is a spring actuated pawl 99 to engage a sector 100. In this way both hoppers 95 may be tilted at the same time by said lever.

I have provided means for driving all of the operative parts of the harvester from the main shaft 11 as follows: Rotatably mounted on the shaft 11 is a sprocket wheel 101 having a clutch member 102. Slidingly but non-rotatably mounted on the axle is a clutch member 103 held by the spring 104 into engagement with the clutch member 102. A bell crank 105 is provided for moving the clutch 103 away from the clutch 102. This bell crank lever is controlled by a rod 106 and lever 107 provided with a pawl 108 to engage the sector 109. This sprocket wheel 101 is arranged to drive the shafts 16, 48 and 56 and I do this by providing a sprocket chain 110 to pass around the sprocket wheel 101 over the sprocket wheel 111, on the shaft 16, under the sprocket wheel 113, on the shaft 48 and over the sprocket wheel 112 on the shaft 56 so that when the harvester is advancing over a field and the clutch is in gear, all of the conveyers will be driven in the proper direction. An idler 114 is provided for holding the chain 110 above the chute 72.

In practical operation and assuming the parts to be in the position shown in Fig. 3, then as the machine is advanced, the roller 34 will strike upon a beet and raise the frame to which it is attached so that the roller may pass over the beet. This will elevate the knife 35 to the exact point where it is desired to sever the top from the beet. The beet tops will pass above the knife 35 and be forced up the inclined bottom 36 and 25 by the conveyer. The beets will stand in the ground until the knife has passed over them and until the digger has loosened them from the ground, whereupon they will be engaged by the spring teeth 54 of the conveyer 52 and carried upwardly to the cleaner chain 60. There they will be separated from the earth and discharged into the beet harvester at the rear of the machine as previously explained. The operator may control the direction of travel of the beet tops and cause them to drop in either one of the hoppers 95 and he may cause these hoppers to discharge their contents whenever full. All of the beets are discharged into the hopper at the rear of the machine and as previously explained, the operator may cause them to be dumped toward either side as desired. In this way, both the tops and the beets are discharged at the sides of the machine toward the ground over which the machine has previously passed so that they will not interfere with digging the next row.

Having thus described my invention, what I claim and desire to secure by Letters Patent of the United States therefor is—

1. The combination of a main frame mounted on wheels, a frame comprising two sides pivoted to the main frame and extended downwardly and forwardly, its lower end capable of swinging upwardly and forwardly, a digging blade arranged between the sides and fixed thereto, and a sliding connection between said digging blade and said main frame.

2. The combination of a main frame mounted on wheels, a frame comprising two sides pivoted to the main frame and extended downwardly and forwardly, its lower end capable of swinging upwardly and forwardly, a digging blade arranged between the sides and fixed thereto and a sliding connection between said digging blade and said main frame and a conveyer mounted between the sides to move articles upwardly and rearwardly over the digging blade.

3. The combination of a main frame mounted on wheels, a frame pivoted to the main frame and having sides extended parallel with a fore and aft line through the main frame, a cutter blade at the bottom of each of said sides, and a series of fingers spaced apart from each other and projected rearwardly from the sides, the rear ends of said fingers being curved outwardly.

4. The combination of a main frame mounted on wheels, a frame pivoted to the main frame and having two sides extended substantially parallel with a fore and aft line through the main frame, each side having a cutting edge at its lower end, and a cutting blade extended downwardly from said sides in the rear of said cutting edges.

5. The combination of a main frame, mounted on wheels, a frame comprising two sides pivoted to the main frame and extended downwardly and forwardly, its lower end capable of swinging upwardly and forwardly, a digging blade arranged between the sides and fixed thereto, a cutting blade supported by the said sides, a bottom between said sides extending from the cutting blades upwardly and rearwardly and a conveyer arranged for traveling upwardly over said bottom.

6. The combination of a main frame mounted on wheels, a frame comprising two sides pivoted to the main frame and extended downwardly and forwardly, its lower end capable of swinging upwardly and forwardly, a digging blade arranged between the sides and fixed thereto, a conveyer mounted between the sides to move articles upwardly and rearwardly over the digging blade, a cutter supported by the said sides in front of the digger, a bottom extending upwardly and rearwardly from said cutter and a conveyer arranged to travel upwardly and over said bottom.

7. The combination of a main frame mounted on wheels, a frame pivoted to the main frame and extended downwardly and forwardly and comprising two sides, each having a cutting edge at its lower end and a digger blade fixed to said sides in the rear of said cutting edges.

8. The combination of a main frame mounted on wheels, a frame pivoted to the main frame and comprising sides extending downwardly and forwardly with their lower edges designed to rest upon or enter the ground surface, earth cutting blades extending from the said edges downwardly and a digger blade fixed to said sides in the rear of the earth cutting blades.

9. The combination of a main frame mounted on wheels, a frame pivoted to the main frame and comprising sides extending downwardly and forwardly with their lower edges designed to rest upon or enter the ground surface, earth cutting blades extending from the said edges downwardly, a digger blade fixed to said sides in the rear of the earth cutting blades, means for limiting the rearward movement of the digger blade and means for raising and lowering the front end of the frame.

10. In a beet harvester, the combination of a frame to be advanced over a field, a digger blade supported by the frame and inclined downwardly and forwardly and having a notched surface, means for carrying beets upwardly and rearwardly over the digger blade and a conveyer having cross bars spaced apart to receive beets from the digger blade and to carry them to a point of discharge.

Des Moines, Iowa, April 12, 1906.

FRANCIS E. NEWLON.

Witnesses:
J. RALPH ORWIG,
W. R. LANE.